Jan. 1, 1946. H. J. BUTLER 2,392,225
BRAKE APPARATUS
Filed June 1, 1945 3 Sheets-Sheet 3
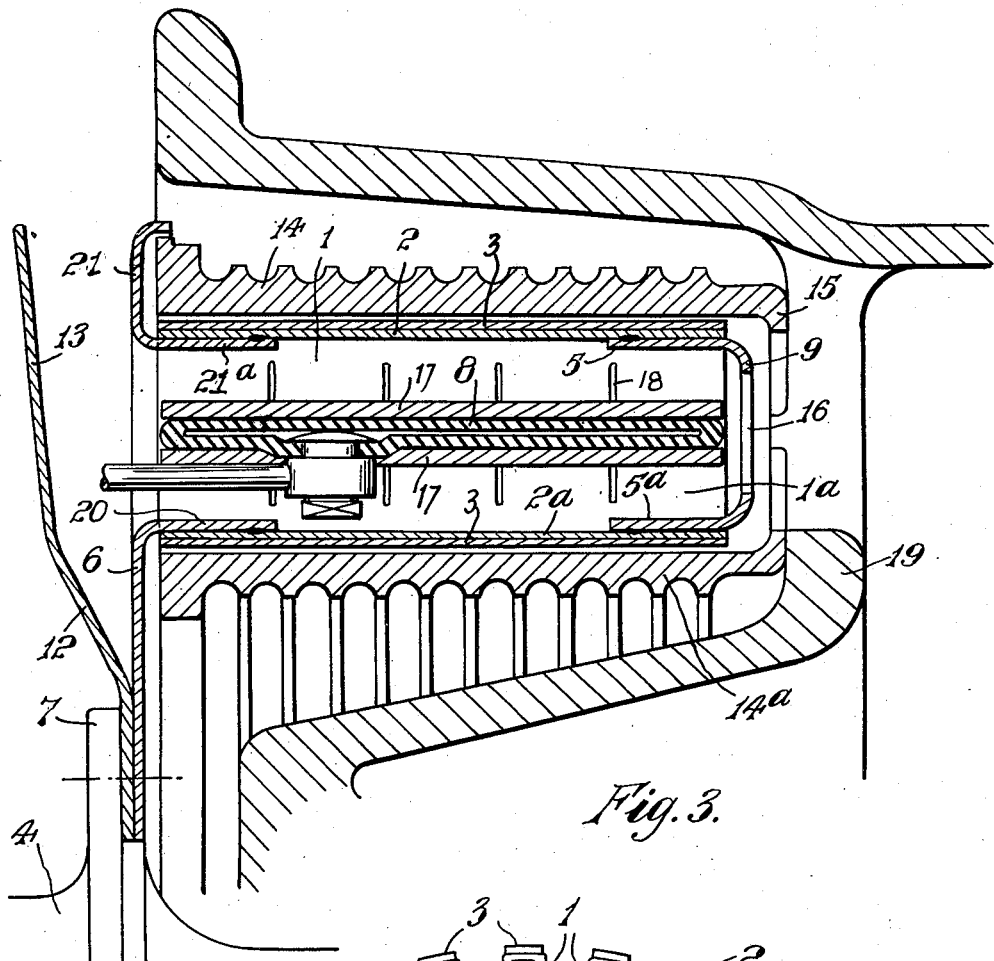

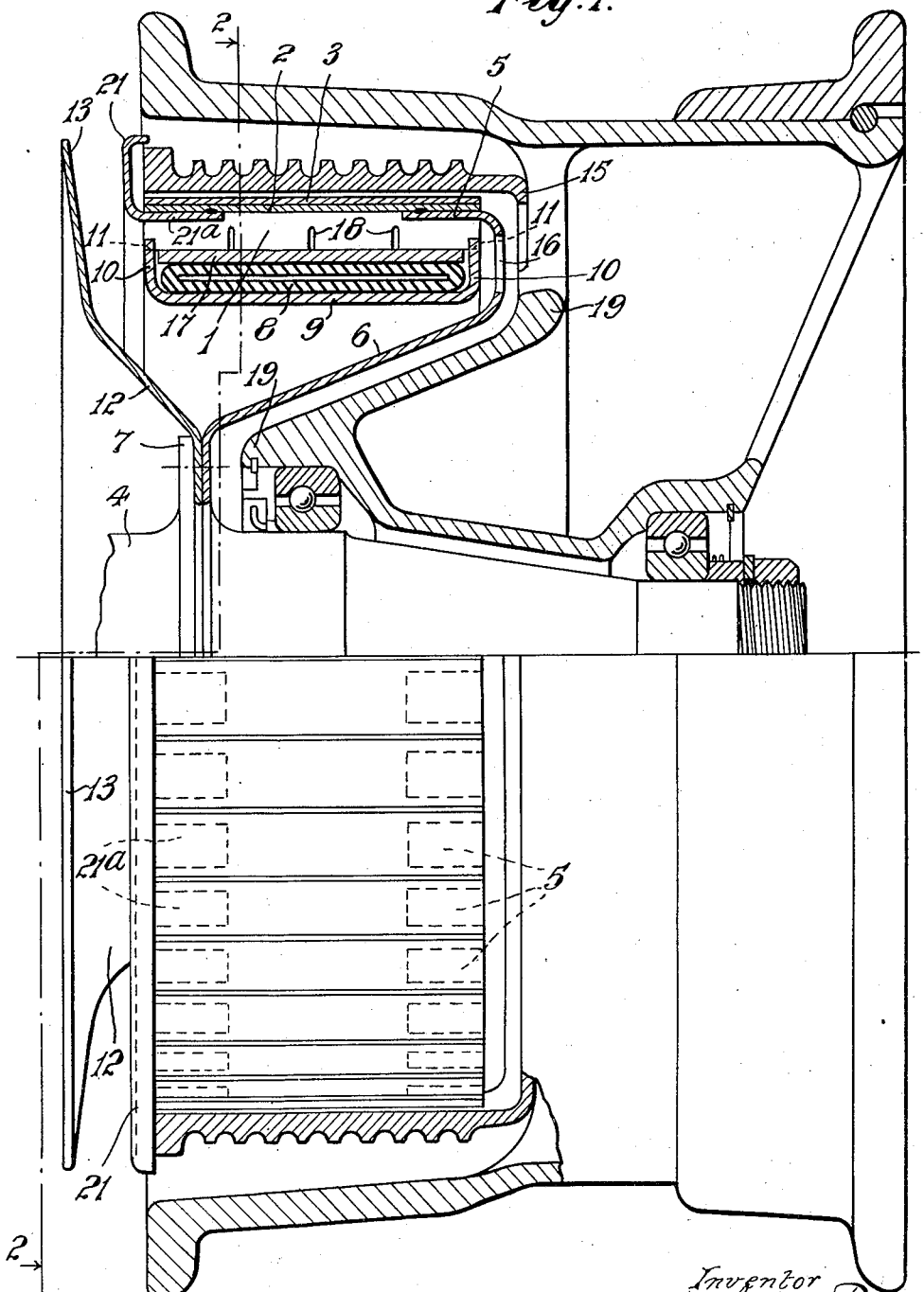

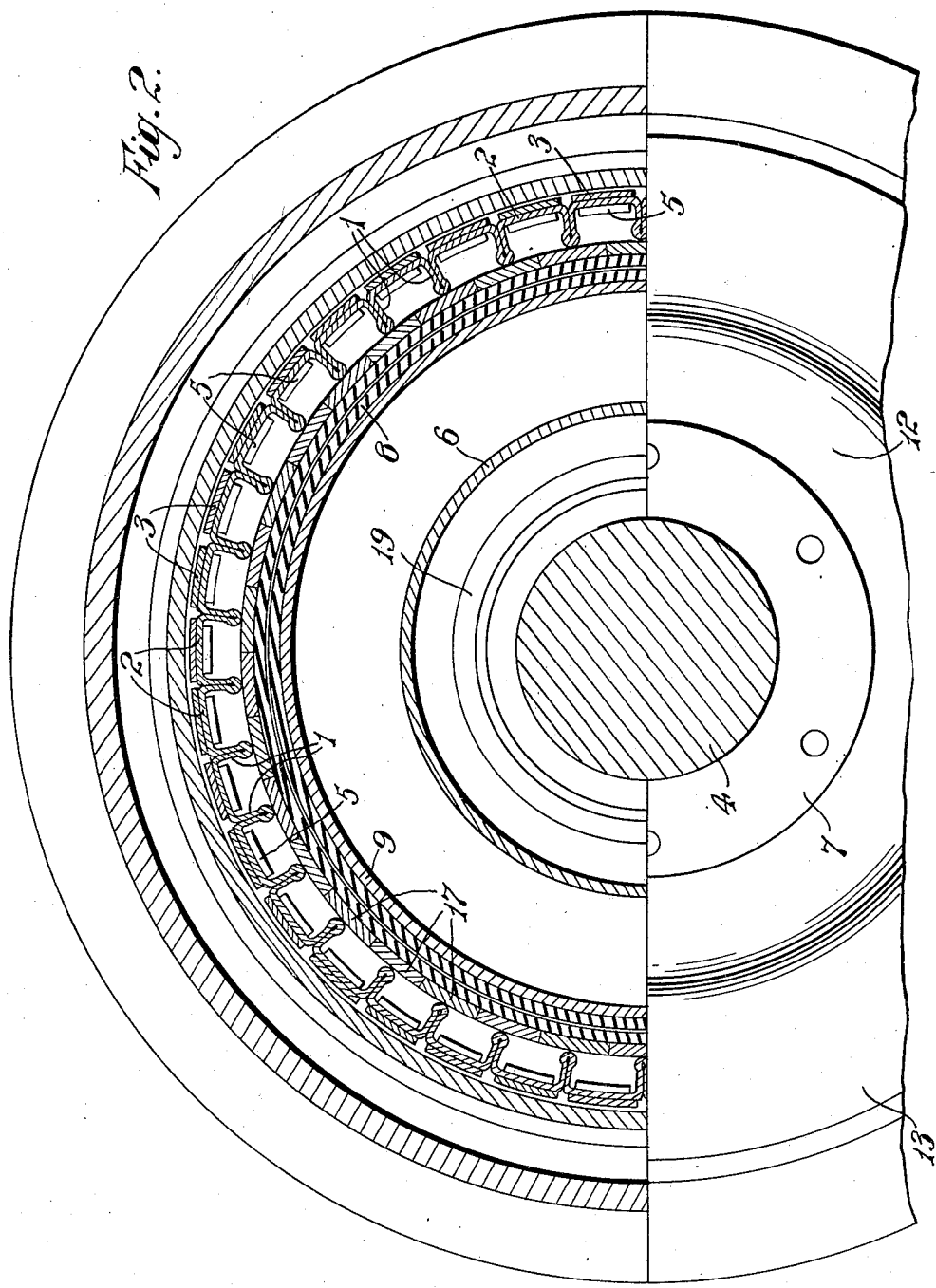

Patented Jan. 1, 1946

2,392,225

UNITED STATES PATENT OFFICE 2,392,225

BRAKE APPARATUS

Henry James Butler, Sutton Coldfield, England, assignor to Dunlop Rubber Company Limited, London, England, a British company Application June 1, 1945, Serial No. 597,122
In Great Britain June 3, 1944

9 Claims. (Cl. 188—152)

My invention relates to improvements in brake and like apparatus and particularly relates to wheel brake apparatus for aircraft of the kind having braking or like friction elements movable radially relatively to an annular support into contact with a brake drum of the vehicle.

The invention has for its object to simplify the construction and improve the efficiency of this type of apparatus.

According to this invention we provide wheel brake and like apparatus of the type having a series of friction elements movable radially by a distensible element relative to an annular support, comprising a flexible metal band on which said friction elements are mounted and a torque resisting disc securable to the permanent hub said band having portions folded transversely of said band between said friction elements and said torque disc having an axially extending series of spring tongues secured to the margin of said band between said folded portions.

In order that our invention may be more clearly understood and readily carried into effect, reference may be made to the accompanying drawings wherein:

Fig. 1 is a part sectional end view of an aircraft wheel provided with brake apparatus constructed in accordance with the invention.

Fig. 2 is a part sectional side view on the line 2—2 of Fig. 1, the deflector plate being broken away.

Fig. 3 is a part sectional view of a modification of the apparatus shown in Fig. 1.

Figs. 4 to 6 are fragmentary views of alternative forms of folded band for use in accordance with the invention.

A convenient embodiment of the invention shown in its application to an aircraft wheel comprises a resilient annular metal band having portions 1 folded transversely at intervals to provide radial webs defining a series of inverted channels the substantially flat surface portion 2 of each of which channels constitutes a backing for one of a series of brake elements 3. The folded annulus is yieldingly positioned in relation to the axle or permanent hub 4 of the wheel by marginal attachment to a series of spring-tongues 5, each of which extends in an axial direction beneath the flat portion 2 of each channel from the periphery of a torque disc 6 secured to a radial flange 7 extending from the permanent hub. Within the folded annulus is disposed a distensible element 8 of rubber or metal carried on an annular support 9 of channel section having walls 10 Fig. 1 of which the edges register with recesses 11 formed in the edges of the folded portions of the said recesses being adapted to locate the annular support relative to the folded annulus.

In order to balance the resilient constraint of the spring-tongues 5 located on one side only of the folded band, there is preferably located adjacent to the opposite side of the band an annular member 21 of a stiff L shaped cross-section the axially extending flange of which is slotted to provide a series of spring fingers 21a which are each secured to the opposite side of the band between its folded portions and are adapted to exert thereon a constraint corresponding to and balancing that of the tongues 5.

Segments 17 of heat resisting material are preferably interposed between the distensible element 8 and the edges of the folded portions, particularly where the distensible element is composed of rubber or the like, such material serving to protect the rubber element from the heat generated by the application of the brakes and also from cutting action liable to develop as the result of the pressure exerted by the edges of the folded portions upon the distensible element. Where the distensible element is of stainless steel the heat resisting segments may be dispensed with, as may also the recesses 11 when a metal distensible element is used having corrugations engaging the edges of the folded portions. The transverse edges of the folds are preferably of rounded cross-section to facilitate flexure along the line of the fold.

In order to impart to the webs some degree of flexibility, particularly where the distensible elements are located side by side, it is desirable to provide the webs with radial slots 18 Fig. 1 so that the webs of the folded annulus may flex slightly and accommodate themselves to distortion of the drum. The braking elements 3 may consist of sintered metal coatings formed upon the flat portions of the folded metal annulus, and the friction surface of the drum may consist of a similar layer of sintered metal.

In Figs. 4 to 6 are shown various modifications of the resilient metal band, in particular of the folds therein.

In Fig. 4 is shown a band having folds of which the constituent web or folded portions 1 are spaced apart circumferentially instead of being substantially contiguous as shown in Fig. 2 and Fig. 5.

In Fig. 5 is shown a band having folds the web portions 1 of which are non-radial and are inclined towards one another on the inner periphery of the band to provide thereat a substantially continuous seating surface.

In Fig. 6 is shown a band having constituent web portions 1 which are substantially contiguous and which extend radially outwardly from folds forming a substantially continuous surface at the inner periphery of the folded band, the friction elements being each conveniently located in one of the channels so provided between the adjacent radial webs of the folds.

As shown in Fig. 3, the invention may also be applied to brake wheels provided with coaxial brake drums, 14, 14a, the annular space between the drums being provided at its inner end adjacent the wheel body 19 with an annular support of channel section, of which the central portion 9 is disposed radially between the drums. The walls of the support extend axially from the central portion and are axially slotted to provide two circumferential series of spring-tongues 5 and 5a spaced radially apart and extending axially between the brake drums. The spring-tongues 5 projecting from the greater diameter edge of the support are secured to the under side of the flat portions 2 of the outer folded annulus and the tongues 5a extending from the lesser diameter wall of the support are similarly secured to the flat portions 2a of the second folded annulus of smaller diameter. The transverse folds 1, 1a of the two annuli project radially towards one another, and have between them a distensible element or elements 8 of rubber or metal preferably with the interposition of heat resisting materials 17.

The two folded annuli 1, 1a and the distensible element 8 are located in relation to the brake drums 14, 14a by a torque disc 6 secured to the flange 7 of the permanent hub 4 the periphery of said torque disc having a series of spring-tongues 20 bent axially inwards towards the wheel and secured to the annulus of smaller diameter. A circumferential series of cooling apertures 16 may be provided in the radially disposed centre portion of the annular support 9 to permit air to circulate through the channels formed by the folded portions of the two annuli.

An annular member 21 having spring fingers 21a is preferably secured to the outer band 1 for balancing purposes on the outer side of said band remote from the spring-tongues 5 and 5a as hereinbefore described with reference to Fig. 1.

In order to provide a cross current of air beneath the braking elements an air-scoop may be provided in the form of a deflector disc or plate 12 fixed to the permanent hub, the peripheral portion 13 of such deflector plate or disc being inclined outwardly away from the brake drum 14 which is secured in known manner by a flange 15 to the wheel body 19. On forward movement of the vehicle air is swept by the leading edge of the deflector disc 12 through the channels of the folded annuli into the body of the wheel through the series of apertures 16 in the annular support, and adjacent apertures in the wheel body, those apertures of the series momentarily behind the trailing side of the deflector disc serving to draw out heated air.

The operation of the improved apparatus is as follows:

On inflation of the distensible element 8 the spring-tongues 5 and 21a of the construction shown in Fig. 1, or the spring-tongues 5, 5a, 20, 21a, of the construction drawn in Fig. 3 are resiliently deflected in a radial direction and the two contiguous thicknesses of metal 1 constituting each of the folded portions are forced apart in a circumferential direction, the slight separation of these contiguous portions when added together around the whole of the annulus sufficing to permit of the required expansion and corresponding radial movement of the friction elements 3. On cutting off the supply of fluid under pressure to the distensible element or elements the resilient spring-tongues resume their undeflected positions assisting circumferential self contraction of the annular band to its original diameter and the radial withdrawal of the friction elements to their original inoperative position.

Having described my invention what I claim is:

1. Wheel brake and like apparatus of the type having a hub, an annular support on said hub, a distensible element on said support, a series of friction elements movable radially by said distensible element relative to said annular support and comprising a flexible metal band on which said friction elements are mounted and a torque resisting disc securable to said hub, said band having portions folded transversely of said band between said friction elements and said torque disc having an axially extending series of spring tongues secured to the margin of said band between said folded portions.

2. Apparatus according to claim 1 wherein the edges of said folded portions are provided with radial slots adapted to impart flexibility to said folded portions.

3. Apparatus according to claim 1 wherein segments of heat resisting material are interposed between said distensible elements and the edges of said folded portions.

4. Apparatus according to claim 1 comprising an annular support of channel section having walls, of which the edges are located in recesses provided in said folded portions.

5. Apparatus according to claim 1 comprising an annular member having spring-tongues secured to said band on the side thereof opposite that to which the spring tongues of the said tongue disc are secured.

6. Apparatus according to claim 1 comprising a second metal band of lesser diameter coaxial with said band, both said band and the lesser diameter band having portions folded towards one another and towards the distensible element, said bands being each secured on the same side to one of two series of spring-tongues extending axially from the walls of the said annular support.

7. Apparatus according to claim 1 comprising an annular metal member having spring fingers secured to the said band between said folded portions on the side of the said band unconstrained by attachment to said spring-tongues.

8. Apparatus according to claim 1 comprising an air deflecting disc, said disc having portion inclined outwardly from the said permanent hub.

9. Wheel brake apparatus which comprises a stationary annular support, a distensible element mounted on said support, a flexible metal band, a series of friction elements mounted at spaced intervals on the outer periphery of said band, said band having folds extending inwardly toward said distensible element, a stationary torque resisting disk and spring tongues extending from said disk to said flexible band between said folds.

HENRY JAMES BUTLER.